US006925293B2

(12) United States Patent
Lindenmeier et al.

(10) Patent No.: US 6,925,293 B2
(45) Date of Patent: Aug. 2, 2005

(54) ANTENNA DIVERSITY SYSTEM WITH PHASE CONTROLLED SUMMATION OF ANTENNA SIGNALS

(75) Inventors: Heinz Lindenmeier, Planegg (DE); Jochen Hopf, Haar (DE); Leopold Reiter, Gilching (DE)

(73) Assignee: FUBA Automotive GmbH & Co. KG, Bad Salzdetfurth (DE)

( * ) Notice: Subject to any disclaimer, the term of this patent is extended or adjusted under 35 U.S.C. 154(b) by 546 days.

(21) Appl. No.: 09/783,000

(22) Filed: Feb. 14, 2001

(65) Prior Publication Data

US 2001/0016478 A1 Aug. 23, 2001

(30) Foreign Application Priority Data

Feb. 17, 2000 (DE) .......................... 100 07 301

(51) Int. Cl.[7] .................................................. H04B 7/08
(52) U.S. Cl. ............................. 455/276.1; 455/277.2; 455/297; 455/273; 375/347
(58) Field of Search ........................ 455/277.1, 277.2, 455/275, 276.1, 272, 278.1, 296, 297, 304, 273; 375/347

(56) References Cited

U.S. PATENT DOCUMENTS

| | | | | |
|---|---|---|---|---|
| 3,593,147 A | * | 7/1971 | Gurak et al. ................ | 455/139 |
| 4,079,318 A | | 3/1978 | Kinoshita | |
| 4,232,339 A | * | 11/1980 | Smiley et al. .............. | 348/495 |
| 5,490,180 A | * | 2/1996 | Muto ........................ | 375/347 |
| 5,517,686 A | | 5/1996 | Kennedy et al. | |
| 5,603,107 A | * | 2/1997 | Gottfried et al. ........... | 455/133 |
| 6,049,705 A | * | 4/2000 | Xue ......................... | 455/277.1 |
| 6,622,013 B1 | * | 9/2003 | Miyoshi et al. ........... | 455/277.2 |

FOREIGN PATENT DOCUMENTS

WO    WO 89/11184    * 11/1989    ............ H04B/7/08

* cited by examiner

Primary Examiner—Edward F. Urban
Assistant Examiner—Blane J. Jackson
(74) Attorney, Agent, or Firm—Collard & Roe, P.C.

(57) ABSTRACT

An antenna diversity system for receiving frequency-modulated (FM) radio signals with the phase-controlled summation of antenna signals for motor vehicles equipped with a multi-antenna system having at least two antenna output signals, and a receiver with an input for each of a first and a second received signal path, wherein the second of the two received signal paths contains a phase-shifter controlled by a phase-controller. The received signal has the same phase on the output of the phase-shifter as in the first signal path. The two received signals are added up in a phase-coincident manner in a summation circuit, and the added-up signal is supplied to the FM frequency modulator. The multi-antenna system contains a controllable logic circuit, so that a received signal that is different in terms of diversity, is supplied in each case to at least one of the two inputs of the receiver in different switching positions assumed by the selector switches, and the added-up signal is supplied to an interference detector for extremely rapid detection of an added-up signal disturbed by a frequency swing. Thus, in the presence of a reception interference, the interference-detecting signal of the interference detector actuates the logic switching device to another switching position, and wherein the phase-controller serves as a low-pass filter for limiting the speed of the phase control.

27 Claims, 9 Drawing Sheets

ANTENNA DIVERSITY SYSTEM WITH PHASE CONTROLLED SUMMATION OF ANTENNA SIGNALS

CROSS REFERENCE TO RELATED APPLICATIONS

Applicant claims priority under 35 U.S.C. §119 of German Application No. DE 100 07 301.8 filed Feb. 17, 2000.

BACKGROUND OF THE INVENTION

1. Field of the Invention

The invention relates to an antenna diversity system for receiving frequency-modulated (FM) radio signals with a phase-controlled summation of the antenna signals. This is suitable for motor vehicles with a multi-antenna installation with at least two antenna output signals, and a receiving device having inputs for a first received signal path, and a second received signal path, whereby the second of the two received signal paths contains a phase-shifter regulated by a phase controller. The received signal has the same phase on the output of the phase shifter as in the first branch, whereby the two received signals are added up in a phase-coincident manner in an adder, and the added-up signal is supplied to the frequency demodulator.

2. The Prior Art

Antenna diversity systems of this type are preferably used for VHF radio reception, and have been in use for a long time, such as described in U.S. Pat. Nos. 4,079,318 and 5,517,686. The object of these diversity systems is to achieve by phase-coincident superimposition of two or more antenna signals, a stronger and more useful signal than obtained with a single antenna, in order to reduce the probability of level fading in the field of multi-way propagation. This leads in the combined signal to a signal-to-noise (S/N) ratio that is more favorable on the average with respect to the noise of the receiver. The flawless mode of operation of such an antenna diversity system, however, is limited by the fact that the partial waves (Rayleigh wave reception field) differ from each other only in insignificant ways with respect to their instantaneous frequency, with the result that there is no audible reception interference. In reception situations where beams of waves with the different transit times $\tau_o$ to $\tau_3$ superpose each other in the location of reception, the partial waves received no longer have the same frequency, and as a result of such superimposition, lead to disturbing frequency swings. During driving, these swings, following frequency demodulation, frequently lead to a spontaneously occurring static noise. The wave beams with the different transition times superimpose each other in the location of reception depending in each case on a Rayleigh distribution, which has different effects in conjunction with the different antennas installed on the vehicle. Thus, the antenna signals of two diversity antennas on the vehicle may also have different instantaneous frequencies particularly in the area of level fading. The difference between these frequencies is conditioned by the frequency modulation of the high-frequency carrier and, as a rule, is very substantial. The resulting phase difference should therefore be controlled by the phase shifter in the second signal path, if the signal in the first signal path has no disturbing frequency swings. On the other hand, in conjunction with rapid phase control, a signal disturbed in the first signal path would impress its interference, by the control process on the second signal path and thus forcefully cause such interference in the combined signal as well. Another drawback of this system is that it is limited to two antenna signals, so that no adequate effect in terms of diversity can be achieved with such a system. Interference in the neighboring channel acts in a similar manner because of a limited selection on the level of the intermediate frequency. Even signals occurring on the received channel due to intermodulation of other VHF transmitters cause, in association with level fading, disturbing frequency swings acting on the useful signal. These swings cannot be eliminated with the phase control system.

SUMMARY OF THE INVENTION

Therefore, an object of the invention is to avoid these drawbacks in conjunction with an antenna diversity system and to increase the number of the effective antenna signals at favorable cost, and to thereby enhance the efficiency of the diversity system.

A particularly important advantage of the present invention is that a great number of antennas or antenna signals can be utilized in conjunction with a limited number of phase-controlled signal paths, which drastically reduces the probability for receiving disturbed signals. The extent of the signal improvement made possible by the invention is explained in greater detail in the following exemplified embodiment of the invention. The required technical expenditure remains extremely low because it is limited to electronic reversing measures and intelligent electronic circuits, which can be employed at a lower cost since the circuits are highly integrated. This increase in the efficiency is accomplished without providing expensive additional frequency changers and phase control circuits. Furthermore, using a plurality of control circuits, which can be controlled only with difficulty with respect to their controlling properties, would also complicate the system. Even in a case where at least one antenna signal among the ones that are available remains undisturbed, the interference detector of the present invention will continue to emit interference detection signals after each reversing process until only an undisturbed received signal is available on the two inputs which, in the receiver, leads to an undisturbed, combined signal.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
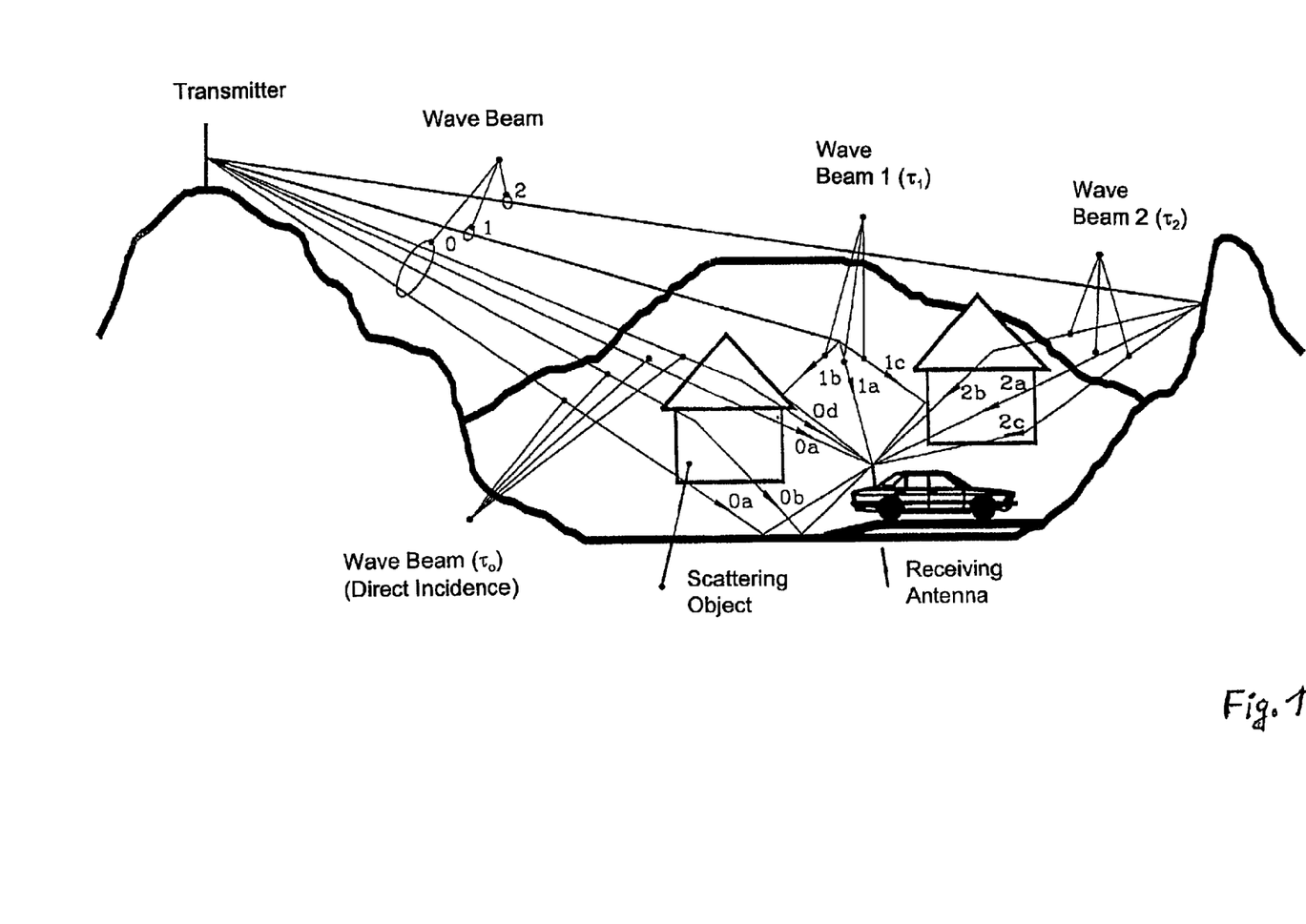
FIG. 1 shows the receiving situation in a wave field disturbed by multi-way propagation for a motor vehicle.

FIG. 1 shows the receiving situation in a wave field disturbed by multi-way propagation. In reception situations as shown, for example in FIG. 1, where beams of waves with the different transit times $\tau_o$ to $\tau_3$ superpose each other in the location of reception, the partial waves $0a$, $0b$, $0c$, $1a$, $1b$, $1c$, $2a$, $2b$ and $2c$ received no longer have the same frequency, and as a result of such superimposition lead to disturbing frequency swings. During driving, such swings, following frequency demodulation, frequently lead to spontaneously occurring static noise. The wave beams with the different transition times superimpose each other in the location of reception depending in each case on a Rayleigh distribution, which has different effects in conjunction with the different antennas installed on the vehicle, so that the antenna signals of two diversity antennas on the vehicle may have different instantaneous frequencies particular also in the area of level fading. The difference between such frequencies is conditioned by the frequency modulation of the high-frequency carrier and, as a rule, is very substantial.

Figure 2:
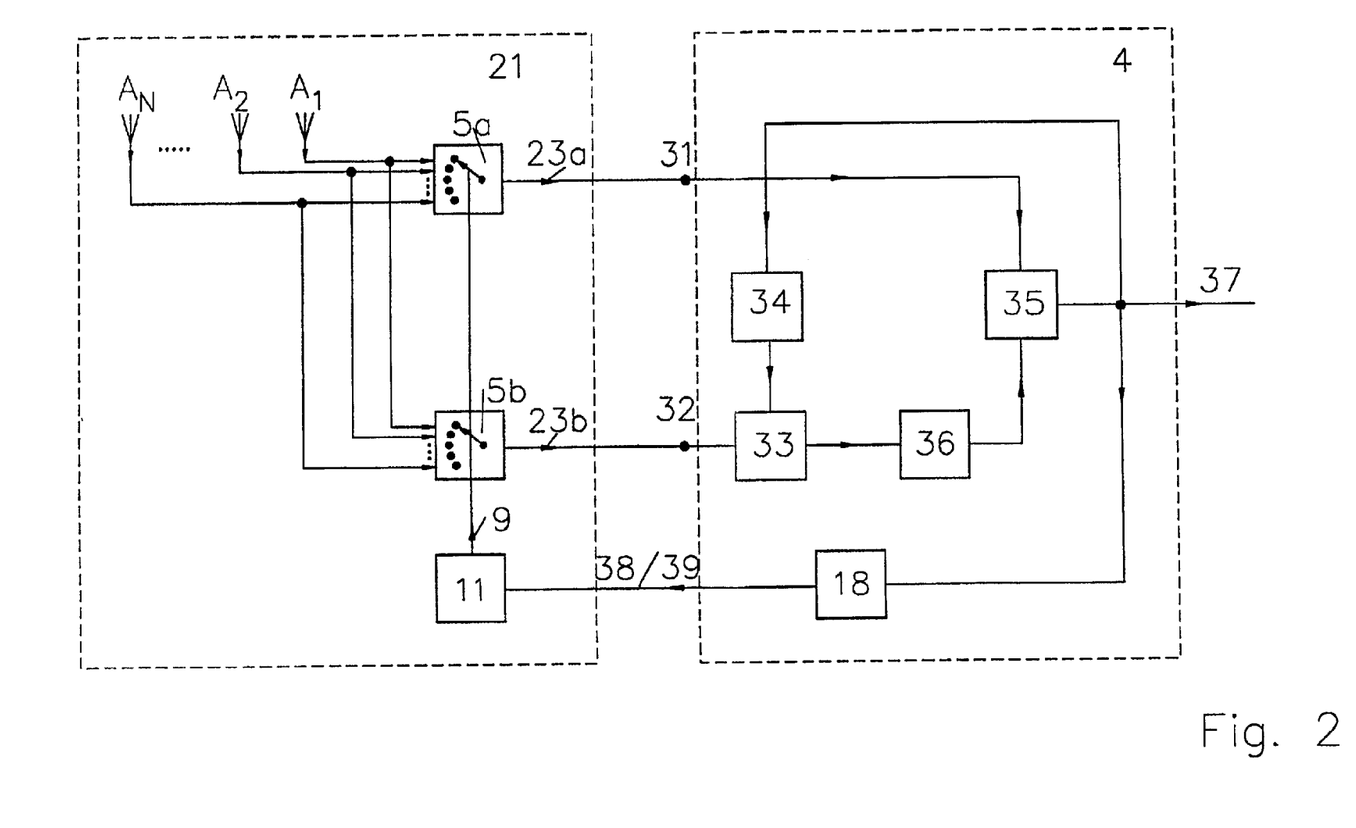
FIG. 2 shows a first embodiment of an antenna diversity system as defined by the invention.

FIG. 2 shows a circuit for an antenna diversity system as defined by the invention, with an antenna system comprising a multi-antenna system 21, a receiver 4 with the signal path 1, 31 and the signal path 2, 32. There is a switching device 11, wherein all of the received signals $23(a)$ and $23(b)$ are simultaneously provided to both of the two signal paths 31, 32. A phase control circuit consisting of a phase controller with the low-pass characteristic 34, and with a phase shifter 33 for adding up the signals in a phase-coincident manner in the summation member 35, is located in receiver 4. In addition to being supplied to the FM receiver 1, the added-up output signal 37 is supplied to the phase controller with the low-pass feature 34 for phase control, on the one hand, and to an interference detector 18, on the other hand, for rapid interference identification, so that another received signal 23 is assigned to at least one of two signal paths 31, 32 by means of an interference detection signal 38 which controls switching device 11.

In further detail, signal 23b in the second received signal path 32 is acted upon by transmission block 36 which generates auxiliary modulation of the signal, with the help of phase-shifting device 33, controlled by a phase-controlling device 34, so that the signals 23a and 23b in the first and in the second received paths 31, 32 are added up in a phase-coincident manner at output 37 of summation member 35. The controllable switches (5a, 5b . . . ) are contained in the multi-antenna system 21. With the help of these switches, signals 23a and 23b each are transmitted to the first received signal path 31 or to the second received signal path 32, respectively, depending on the switching positions assumed by the controllable switches 5a and 5b. Two of the antenna signals $A_I$–$A_N$ are thus added up, in each case in a phase-coincident manner, with the help of the received signals paths, so that this summation may take place both on the level of the high-frequency received signal, and on the level of the intermediate frequency.

In order to prevent disturbing frequency swings in signal 37 that cannot be eliminated by phase-shifting device 33, signal 37 is supplied to an interference detector 18 for rapidly detecting the added-up signal 37 disturbed by the swings of the frequency. The interference detection signal 38 at the output of detector 18 containing added-up signal 37, is then, in turn, supplied to a controllable logic switching device 11 in multi-antenna system 21. Switching device 11 supplies another received signal by selecting a different switching position of switches 5a and 5b on at least one of inputs 31 and 32, respectively. Rapid further stepping of switches 5a and 5b has the effect that phase control circuit 34 is first stepped out of phase.

In order to make sure that no excessively rapid phase changes ensue from the renewed build-up of phase control circuit 34 by phase shifting device 33, whereby time gaps would generate an audible increase in the disturbing swing of the frequency, it is therefore necessary according to the invention to design phase-control circuit 34 with a low-pass transmission function, i.e. the maximum speed of the change in phase has to be adjusted so that no audible, disturbing frequency swings can occur within the trapping or operating range of the phase control circuit. On the other hand, the speed of the phase control must not be limited so that when driving through the Rayleigh wave reception field, the resulting changes in the phase of signals 23a and 23b with undisturbed frequency swing will not cause phase control circuit 24 to no longer be capable of following the required phase change for superimposing the signals in summation member 35 in a phase-coincident manner. Time constants in the order of magnitude of from 1 to 20 ms are useful for this purpose. In the course of the build-up time of the control circuit for the new pair of antenna signals, no additional disturbances will then occur, but the time behavior of signal 37 during this time will rather be comparable to the reception in the Rayleigh reception field. Also, in the borderline case, in which the phase-controlling device is not capable of building up, an interference-free signal 37 will thus be assured with the help of a multitude of antennas because the signal is monitored with the help of interference detector 18.

Figure 3:
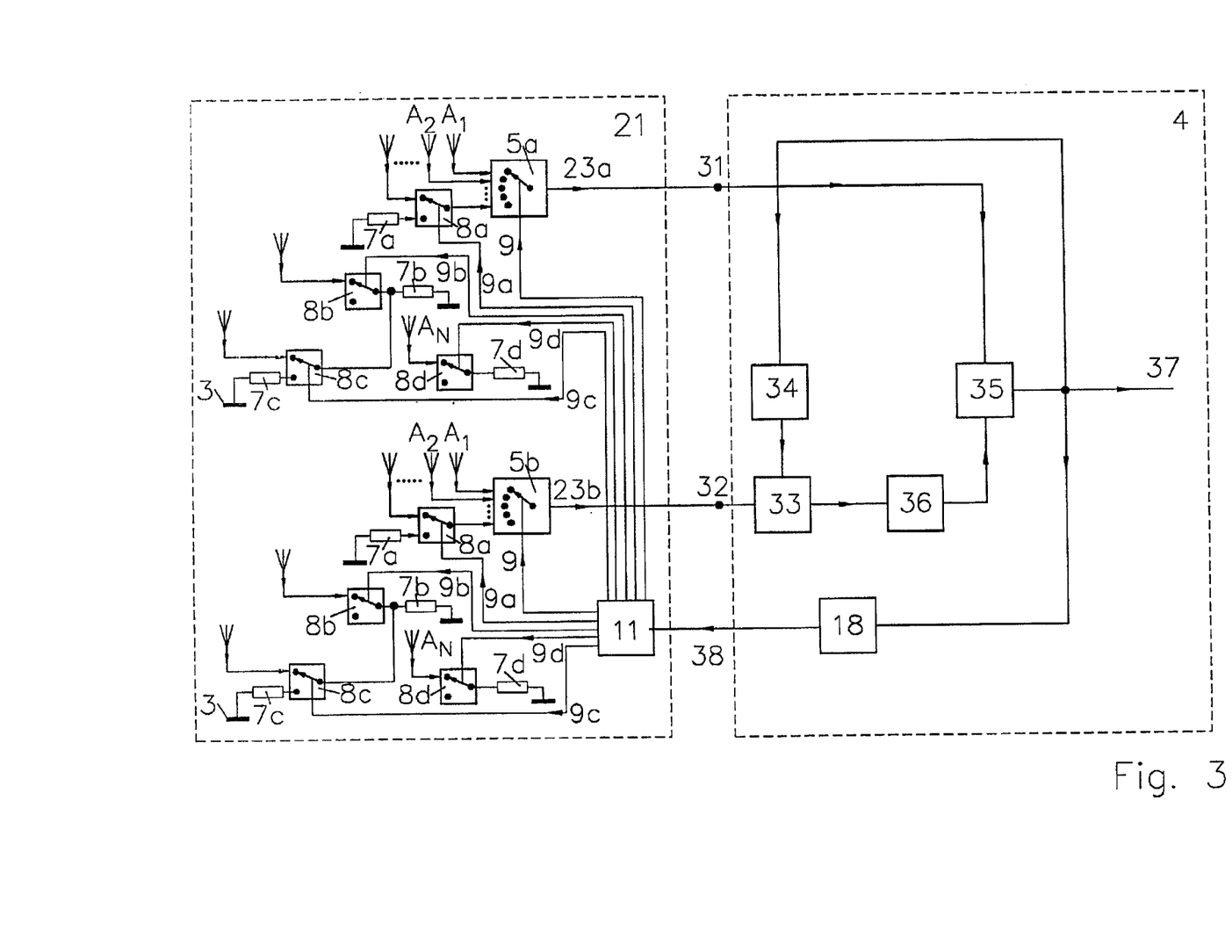
FIG. 3 shows a circuit having a similar arrangement as the circuit in FIG. 2 except designed to operate with a more complex antenna system.

FIG. 3 shows a similar circuit arrangement as that of FIG. 2, with a more complex antenna system. Here, switching device 21, generates additional, different antenna signal by way of in-line impedence elements 7a–7d, which are switched in an alternating manner by means of switches 8a 8d respectively, and connected to a ground terminal 3, or example on one side. By reversing the impedance elements 7a to 7d with the help of the switches 8a to 8d, signal pairs 23a and 23b, which may differ from each other in all kinds of different ways are supplied to the received signal paths 31 and 33, respectively with the help of the multi-antenna system.

Figure 4:
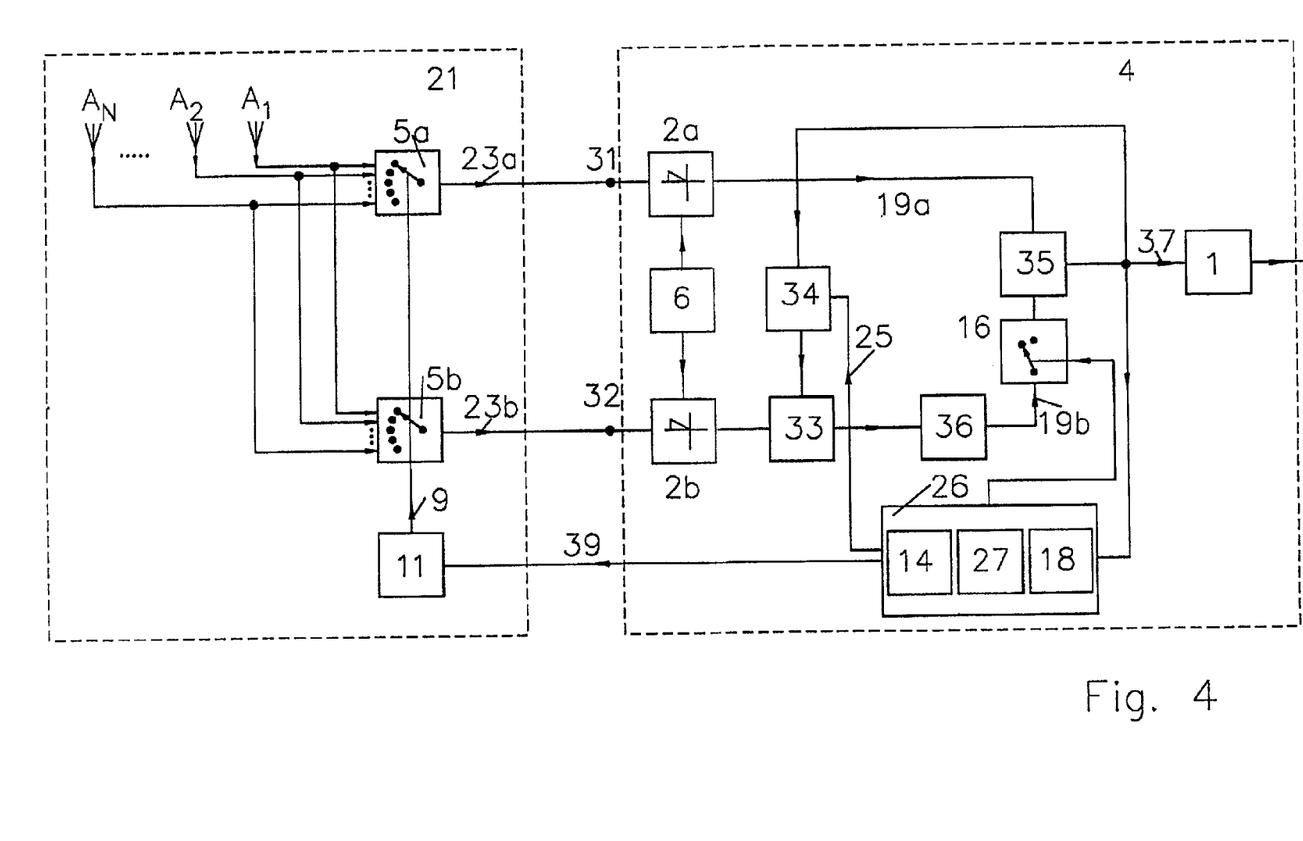
FIG. 4 shows a further circuit arrangement from the one of FIG. 2, also having signal summation in the intermediate frequency range downstream of the mixers of the receiving device.

FIG. 4 shows a similar circuit arrangement as the one in FIG. 2, with a signal summation in the intermediate frequency range, downstream of mixers 2a, 2b of receiving device 4, the mixers being controlled by a common local oscillator 6. Receiving device 4 comprises a signal evaluation processor 26 that contains an interference detector 18, a time member 27 for the determination of the time intervals between occurring disturbances, as well as a logic circuit 14 for controlling switching device 11, and for reversing from the phase mode to the scanning mode. The change-over takes place by dividing one of the two signal paths with the help of a signal path switch 16, and by shutting down phase controller 34, with its low-pass characteristics with the help of phase-setting signal 25, when the frequency of disturbances in the added-up output signal 37 becomes excessive. If the frequency of disturbances in output signal 37 is adequately low in the scanning mode, the system switches back to the phase mode.

Figure 5:
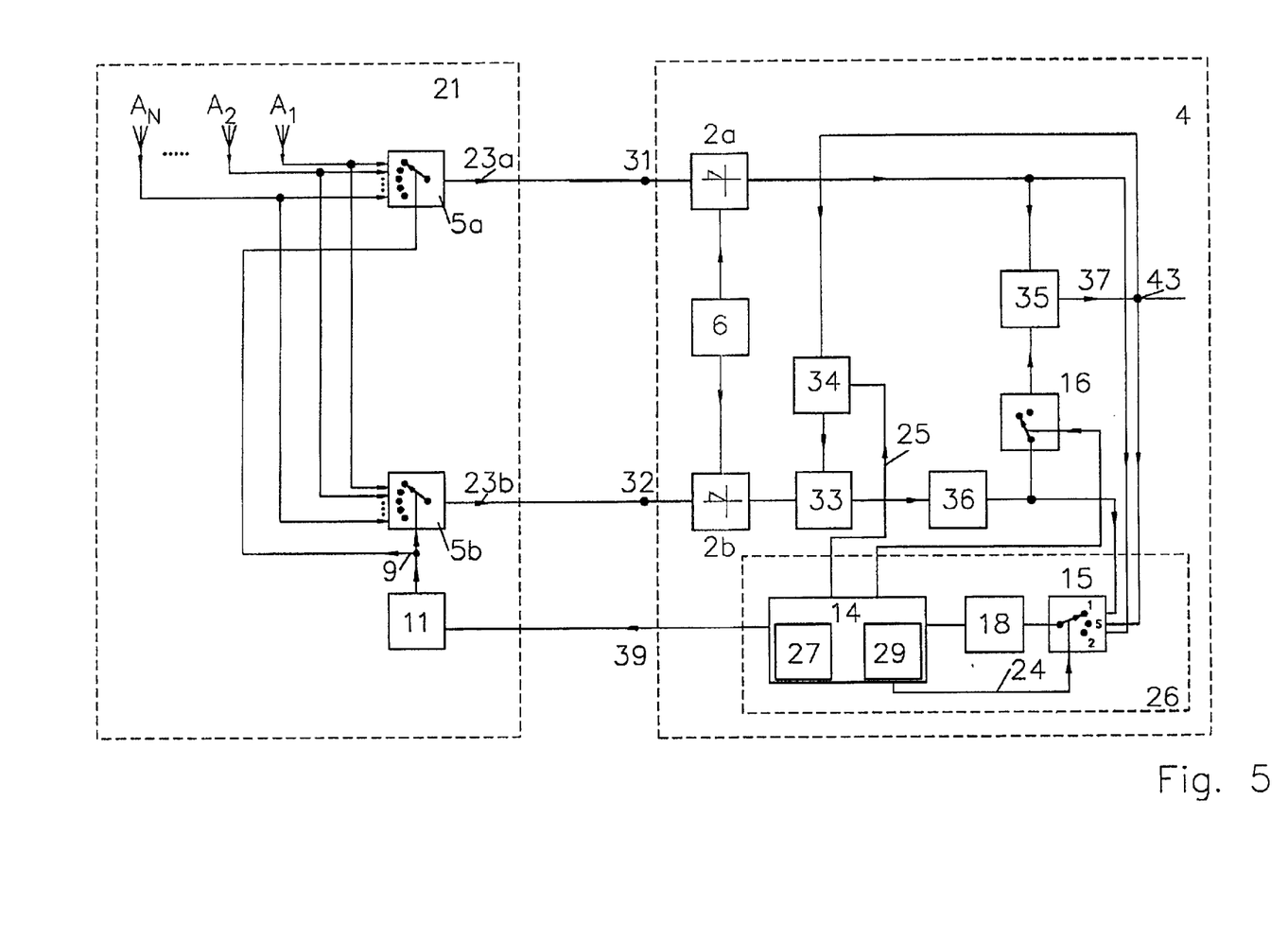
FIG. 5 shows a similar circuit arrangement as the one of FIG. 4, except having a signal path selector cycled by the cycling signal for separately testing both the signals in two signal paths.

FIG. 5 shows a similar arrangement as the one in FIG. 4, having a signal path selector switch 15 cycled by a cycling signal 24 from clock 29 in logic circuit 14, for separately testing both the signals in the two signal paths 31, 32, and the added-up output signal 37 on the output of summation member 35. In the phase mode, if the frequency of disturbance occurring in the added-up output signal 37 is excessively high, the system reverses to the scanning mode with the help of logic circuit 14, and received signal 23a is switched on in signal path 31, such signal being selected with high priority from a priority list. This priority list is filed in signal path 2 in logic circuit 14 by sequentially switching on and testing the frequency of disturbances of all available received signals 23b. The priority list is thus continually updated. When reversing to the phase mode is effected, the two best received signals 23 among all available received signals are first allocated to signals paths 31, 32 according to the priority list. If disturbances continue to occur in the added-up output signal 37, the poorer of the two received signals 23 is always replaced by another signal.

Figure 6:
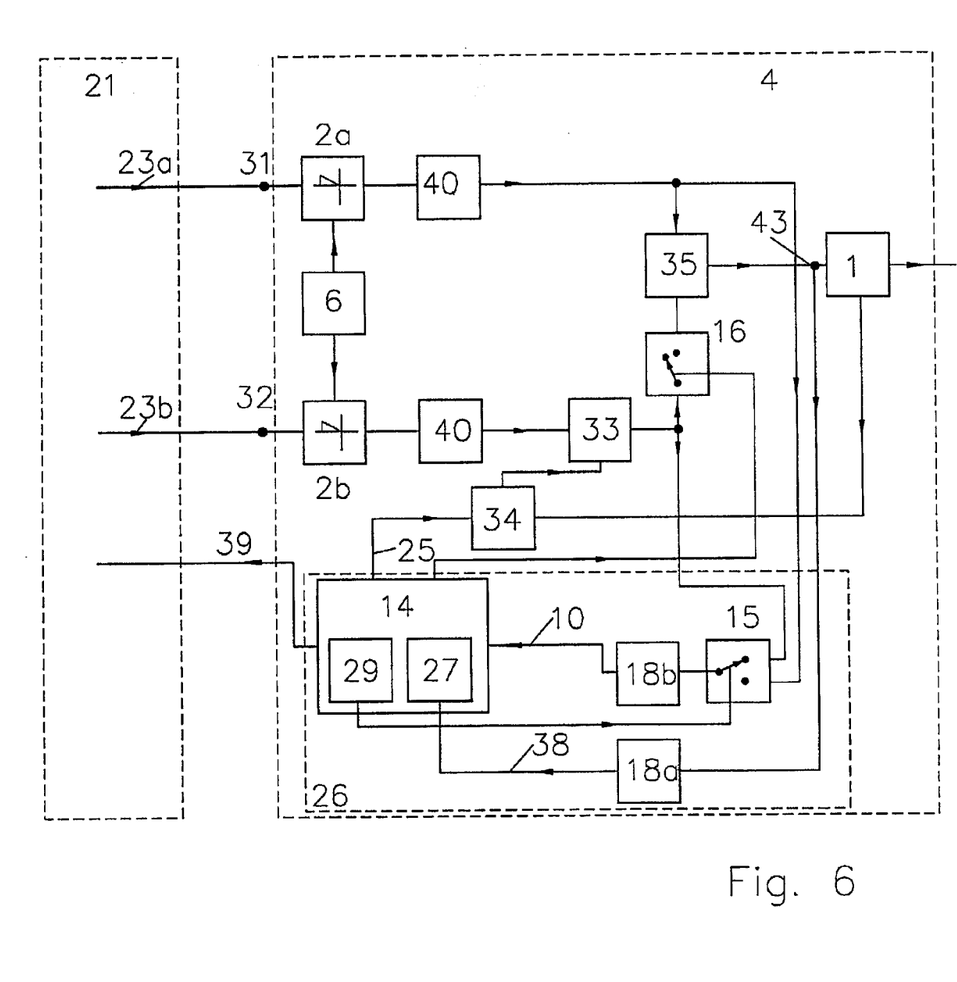
FIG. 6 shows a similar circuit arrangement as the one of FIG. 5 except having an interference detector with a superior resolution and precise line-up of the received signals in a tabulated priority list.

FIG. 6 shows a similar circuit arrangement as the one in FIG. 5 however, having an interference detector 18b with superior resolution is connected via signal path selector 15 for tabulating the priority list, detector 18b testing the received signals 23b in the scanning mode. Moreover, there is an interference detector 18a with an extremely rapid indication, which is provided to avoid excessively long test times in the added-up signal path 43 and in order to avoid any audible disturbances associated with such excessive test periods. After reversing the system to the phase mode, the received signals 23 in the two signal paths 1,2, 31,32 are sequentially tested by reversing signal path selector 15.

Figure 7:
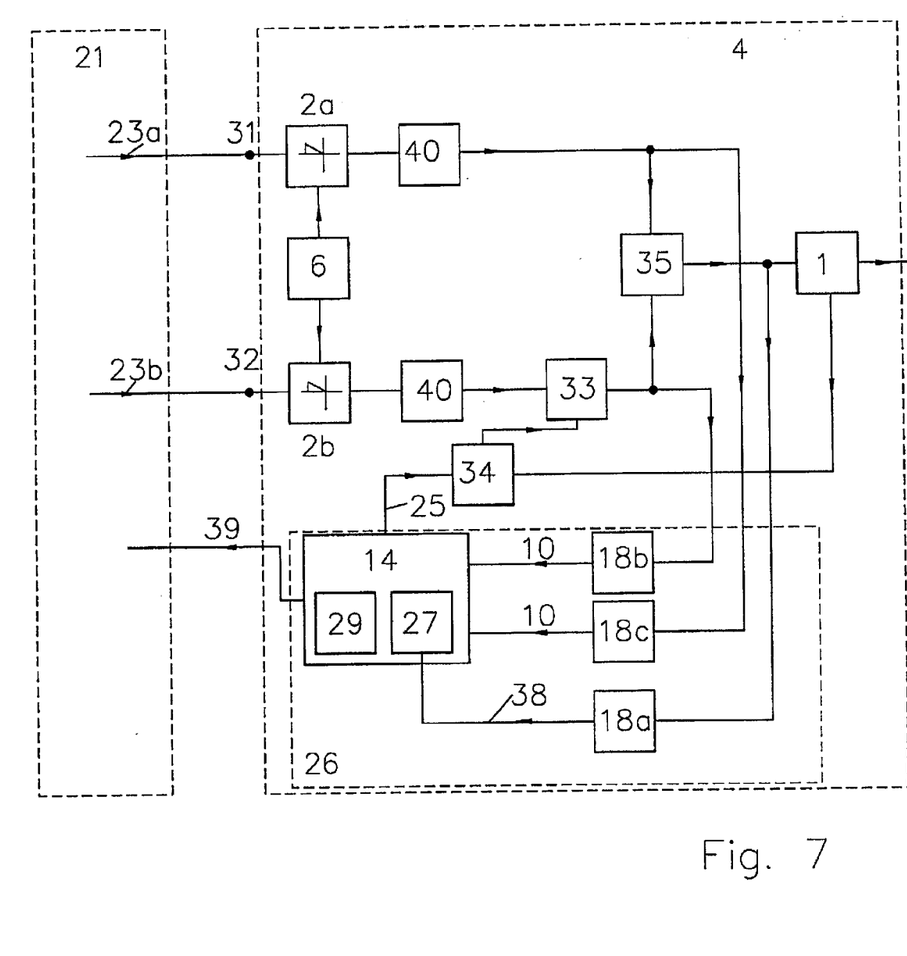
FIG. 7 shows a similar circuit arrangement as the one of FIG. 6 except having two separate interference detectors with superior resolutions for providing a permanent availability of the priority list in the scanning mode.

FIG. 7 shows a similar circuit arrangement as the one in FIG. 6 however, having two separate interference detectors added with superior resolutions 18b, 18c, for the purpose of a permanent availability of the priority list in the scanning mode, and for enhanced indication of the better signal in the phase mode. The additional interference detector 18c with the superior resolution is introduced as a further advantageous measure, so that signal path selector 15 can be omitted. The quality of the priority list is improved further in this way. With the systems shown in FIGS. 5–7 it is possible to realize in conjunction with a preset antenna arrangement, the maximally attainable diversity efficiency with a minimum of interference-afflicted switching activity.

Figure 8:
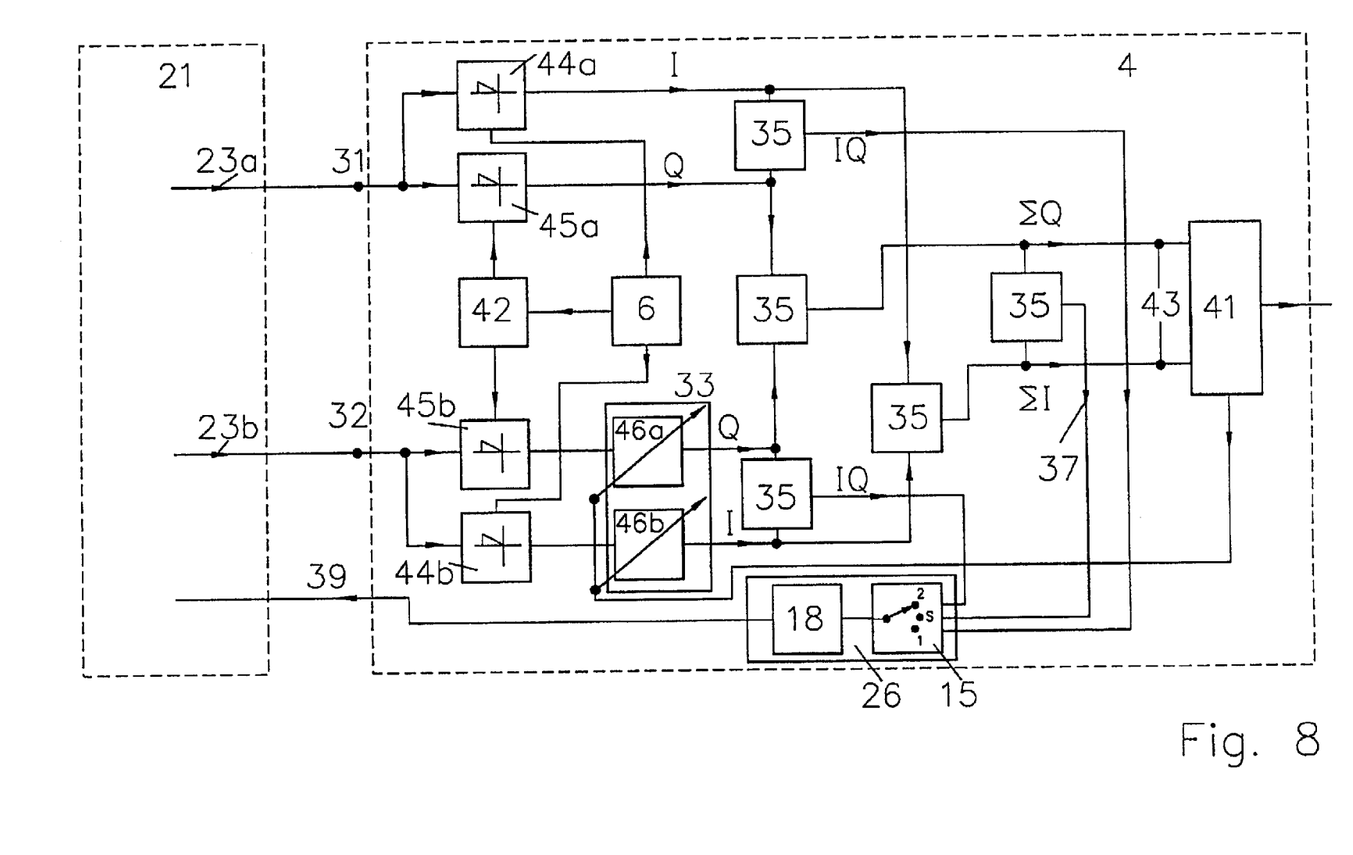
FIG. 8 shows a circuit arrangement as defined by the invention, with an I-frequency changer and Q-frequency changer 45 in each of its two signal paths.

FIG. 8 shows an arrangement as defined by the invention, with an I-frequency changer 44a and 44b, as well as a Q-frequency changer 45a and 45b in each of two signal paths 1, 2; 31, 32, and with the summation members 35 for re-forming the frequency-modulated signals in signal paths 1, 2; 31, 32 and in the added-up signal path 43 for the purpose of rapid detection of the interference with the analogous operating interference detectors 18. The phase is shifted by separate evaluation of the intermediate-frequency I- and Q-signals in phase shifter 33. In a DSP processor 41, the signals ΣQ and ΣI are digitized separately, and phase shifter 33 is preferably digitally controlled by phase controller 34 having low-pass characteristics. Quadrature-type modulators are frequently employed in modern receiver technology for shifting the frequency. In FIG. 8, the receiving device contains an I-frequency shifter 44a, 44b, and a Q-frequency shifter 45a, 45b each controlled by a common oscillator 6. The control of the Q-frequency shifters takes place via a 90° phase-shifting member 42. The intermediate-frequency I- and Q-signals are processed further in modern receiver concepts in a digitally operating processor 41 (DSP). Because of the bit rates in this processor, which are still limited at the present time, it is necessary to design the extremely rapidly indicating interference detector 18 in the form of an analog operating element, and to arrange this detector in the analog section of the receiver. The complete frequency-modulated intermediate-frequency (IF) signal is obtained in both signal paths 31, 32 with the help of summation members 35, whose outputs are connected to the terminals 1 and 2 in signal path selector 15. To form the added-up output signal 37, a further summation member 35 is present, in which signals ΣI and ΣQ are added up and supplied to terminal S of signal path selector 15. The phase in signal path 2, 32 is controlled by the amplitude evaluation members 46a, 46b, which are preferably controlled by DSP processor 41 for regulating the phase. Because of the relatively slow controlling processes, the adjustment of the phase may also take place with the limited data of DSP 41 processor.

Figure 9:
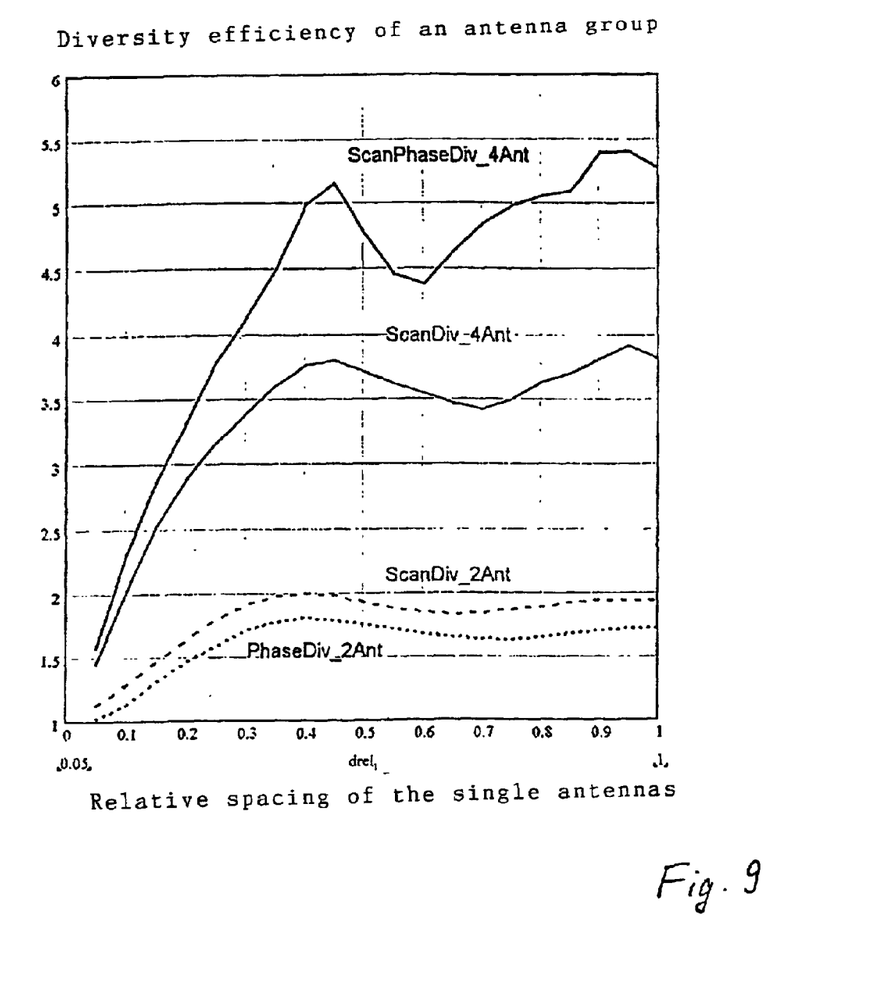
FIG. 9 shows a chart of the diversity efficiency of a linear group of antennas as a function of the spacing between the elements based on the wavelength.

FIG. 9 shows the diversity efficiency of a linear group of antennas as a function of the spacing between the elements based on the wavelength, specifically for the following cases:

PhaseDiv__2Ant: Arrangement in the phase mode with two antennas.

ScanDiv__2Ant: Arrangement in the pure scanning mode with two antennas.

ScanDiv__4Ant: Arrangement in the pure scanning mode with four antennas.

ScanPhaseDiv__4Ant: Arrangement as defined by the invention in the phase mode, with the two least disturbed antenna signals from each of four available antenna signals.

A substantial improvement of the reception quality is achieved with diversity systems. This enhancement results from the diversity efficiency, which in turn can be traced back to the reduction of the frequency disturbances effected by a diversity system. The diversity efficiency n is defined by the equivalent number of antenna signals, which are independent from one another, i.e. de-correlated. If the interference probability occurring in one single antenna signal is denoted by $p_e$, the interference probability occurring on the receiver of the diversity system with the diversity efficiency n is $P_d=P_e^n$. It is possible with this definition to compare different systems to each other with respect to their performance efficiency. For the exemplified embodiment, up to four antennas with omnidirectional characteristics are employed that are positioned in one line with the relative distance of $dr_e l$ from each other, the diversity efficiency n of a plurality of diversity systems is compared in FIG. 9 for the frequently occurring case of disturbances in the same or neighboring channel based on $dr_e l = $ spacing/λ.

If, for example the system shown in FIG. 2, would be operated exclusively with phase control with the interference detector 18 switched off, i.e. according to the prior art. If the two received signals 23 were switched on in a fixed manner by two omnidirectional antennas positioned with the relative distance $dr_e l$, the curve denoted by PhaseDiv__2Ant would result therefrom in FIG. 9 for the diversity efficiency. As compared thereto, the diversity efficiency of a pure scanning diversity system with the same two antennas is shown by the curve ScanDiv_2Ant. The curve denoted in FIG. 9 by ScanDiv_4Ant describes the diversity efficiency of the group of antennas expanded to four antennas and arranged in one line. FIG. 9 shows that the diversity efficiency increases in a steep curve when several of antennas are made available, and may almost reach the numerical number of the antennas if the distances are adequately large.

The improvement achieved by the present invention, beyond the scope of the prior art, is described for example for the group of antennas in FIG. 9, denoted by ScanPhaseDiv_4Ant. Depending on the spacing between the individual emitters of the group of antennas, it is possible in the present embodiment in the pure 4-antenna scanning operation, to raise the diversity efficiency by a factor of 1.5 by applying the present invention. Due to the exponential law of $p_d = p_e^n$, with an error probability of $p_e = 0.1$, the error probability would be reduced for the antenna system as defined by the invention by the further factor of $p_e^{1.5} = 0.03$ based on the pure scanning operation. Similar improvements can be achieved also in a system with 4 antennas arranged in a compact manner on the window pane of a motor vehicle, whereby the varying reception behavior of the antennas results from the varying cooperation with the body of the vehicle in spite of their proximity in relation to each other. Because of the reduced occurrence of disturbances in the added-up output signal 37, a reduction of the effective switching frequency is additionally achieved there, and as a consequence thereof, smoother VHF-reception is experienced if the invention is advantageously realized as shown in the following. Furthermore, in the phase mode, the desired improvement of the signal/noise ratio is achieved by phase-coincident superimposition of the useful signals in the two signal paths. The present invention can be likewise applied to all known diversity systems, i.e. it can be applied to systems with maximum-ratio control, or quite generally with control of the phase in view of an optimal useful signal-noise ratio in the added-up output signal 37 with respect to disturbances in a neighboring channel or in the same channel.

It was found from experience with existing systems that about 50 Hz as the upper limit frequency is favorable for reception in the VHF radio range. This means that the control time TE is not shorter than about 20 ms. The present invention makes use of the fact that a larger number than two receive signals is available in the antenna system with switching device 21. In reception areas with a poor supply, i.e. with high interference frequency in the individual antenna signals, and consequently also in the added-up signal formed from each two of the antenna signals, the phase-coincident summation of these signals does not practically supply any benefit, owing to the fact that no sufficient time is available to the control circuit in such areas that would allow the circuit to build up between successive interference messages. In these reception situations, it is substantially more advantageous if the formation of a sum is omitted by switching off one signal path, and the remaining signal path 1, 2; 31, 32, is then supplied upon occurrence of each interference with another received signal with the help of a rapidly reporting interference detector 18. This means that the system now operates in the pure scanning mode.

In order to assure useful utilization of the two signal paths in areas where the frequency of disturbance of the antenna signals varies, the invention provides reversing between the phase mode and the pure scanning mode, with allocation of different antennas according to the strategies described as follows. If the antenna system is started in the scanning mode, i.e. when the signal path 2 in FIG. 4 is switched off by opening the signal path switch 16, the phase-setting signal 25 of the phase controller 34 with the low-pass characteristics is shut down, and the FM-receiver exclusively receives the received signal 37 on the output of summation member 35. If an interference occurs in the added-up output signal 37, an address signal 39 is generated via logic circuit 14, and another received signal 23a is switched through by the address signal via switching device 11. A timer member 27, present in signal evaluation processor 26 is activated in each case by interference detection signal 38, and the time elapsing until the next interference detection signal 38 that follows is detected with the help of timer member 27. According to the invention, a change from the scanning mode to the phase mode is useful when over an adequate number of such sequences, the switch-on time TA of the successive received signals 23a is notably longer than the build-up time TE of the phase control circuit. A preset switch-on time TASP, which is preferably selected to a value of from 5 to 10 times the value TE, therefore serves as the criterion for triggering a reversing command S-P for changing from the scanning mode to the phase mode. When the build-up time TA reaches the time TASP, which is selected as the criterion, signal path 2 (32) is added on by closing signal path switch 16; phase controller 34 with the low-pass characteristic is activated by releasing it by means of phase-setting signal 25, and the phase control circuit is thus closed. Due to the adequately low interference frequency, which is tested with the help of TA, the phase control circuit is capable of building up. This build-up may take place with the help of any desired pair from the available received signals 23. The optimal selection of the received signals 23 supplied to the two signal paths 1, 2; 31, 32 from among the available received signals, is described in the following, farther below.

If reception disturbances occur in the phase mode in the added-up output signal 37 due to poor reception conditions for all received signals 23, these disturbances are detected by the rapidly reporting interference detector 18; time member 27 is activated; and at least one of the received signals 23 is first replaced successively via logic circuit 14 and switching device 11. With each occurrence of the interference detection signal 38, the switch-on time TA for the switched-on pair of received signals 23 is determined simultaneously. A preset switch-on time TAPS, therefore, serves as the criterion for triggering a reversing command P-S for reversing from the phase mode to the scanning mode, the switch-on time TAPS preferably being selected in a value from 5 to 10 times the value of TE as well. When the switch-on time TA reaches the time TAPS selected as the criterion, signal path 2, 32 is switched off by opening signal path switch 16; phase controller 34 with the low-pass characteristics is set in a fixed manner by phase-setting signal 25; and the phase control circuit is thus opened. This means that the system is now switched back to the scanning mode. The system thus can be reversed with the criteria TAPS and TASP between the two operating modes, taking into account the low-pass characteristics of the phase control circuit, and the drawback that a phase control circuit does not come to rest in areas where reception disturbances occur frequently, an occurrence that can be avoided by the system of the invention.

In further advantageous embodiments of the invention, circuit arrangements shown in FIGS. 5 to 8 implement a strategy in the scanning mode to the extent that the frequency of disturbance of the individual signals is determined with the help of the switched-off signal path 2 by switching on the available received signals 23b in an alternating manner, and a priority list is tabulated in logic circuit 14 with respect to the purity of received signals 23b in terms of their freedom of interference. This means that the priority list is always available in logic circuit 14 in an updated form while the system is operating in the scanning mode. If the criterion TASP for reversing from the scanning mode to the phase mode is satisfied, the signals leading the priory list are allocated according to the invention to signal paths 1,31 and 2,32. The system is thus capable of building up in the phase mode with the two best signals. This minimizes the probability of disturbances occurring in the phase mode in the added-up output signal 37, and the greatest possible stability of the system is assured. In the phase mode, it is possible according to a further embodiment of the invention to separately detect the reception disturbances in the received signals 23a and 23b, and to replace the weaker one of the two received signals 23a and 23b by another available received signal 23, when an interference occurs in the added-up output signal 37. As a rule, such an exchange takes place without disturbing output signal 37 in any way.

In the circuit arrangement of FIG. 5, this method is realized with the help of signal path selector switch 15, which is controlled by a clock 29 located in logic circuit 14. In the scanning mode, interference detector 18 is reversed in this connection by clock 29 in an alternating manner between switching positions 1 and "S" for testing received signal 23 in signal path 2 and, respectively, the received signal 23 in the added-up output signal 37. Each of the signals are switched by timer 29 to interference detector 18 over a required period of test time, so that an address signal 39 is emitted in logic circuit 14, which causes received signal 23a to reverse if an interference is present in the added-up output signal 37, and updates the priority list for the available received signals 23 by testing the received signal 23b in signal path 2. By employing a signal path selector 15, which is provided with an extremely rapid indicator 18a, the costly use of a plurality of interference detectors 18 is thus circumvented. If the TASP criterion is satisfied, the system reverses to the phase mode, and those received signals 23 that are presently updated in the list of logic circuit 14 with the highest or high priority, are supplied to the two signal paths 31, 32. In the phase mode, signal path selector 15 is sequentially reversed between the three switching positions, in each case over the test time period required by interference detector 18, so that the frequency of interference of both the individual signals of the two signal paths and of the added-up output signal 37 is present in this mode in logic circuit 14. In the event an interference occurs in the added-up output signal 37, the signal having the higher frequency of disturbances is then replaced in the signal path. For the purpose of avoiding audible disturbances, the interference detection time of interference detector 18 should not be substantially greater than 50 μs.

Rapidly indicating interference detectors 18 of the prior art as described, for example in German patents P 33 26 062.9, P 33 34 735.2, and P 35 17 247.90, have a comparatively poor resolution with respect to the quantity of interference because of their capability of detecting reception disturbances in the added-up output signal 37 in the required time of less than 50 μs. Therefore, for the quantified determination of the quantity of a disturbance for the purpose of a line-up in the priority list, it is desirable to employ an interference detector 18b with superior resolution of the known type, for example from German patent P 32 43 146.5-35.

With the future developments in the field of microelectronics it is expected that data rates of such magnitude will be available in the near future that permit the rapid detection of interference in DSP 41 processor to be carried out within the framework of digital signal processing as well. This means that the overall strategy described above for evaluating the available received signals 23 may take place in processor DSP 41 in the form of correspondingly conceived software for the digitized signal process.

While a few embodiments of the present invention have been shown and described, it is to be understood that many changes and modifications may be made thereunto without departing from the spirit and scope of the invention as defined in the appended claims.

What is claimed is:

1. An antenna diversity system for receiving frequency-modulated (FM) radio signals in an FM receiver with the phase-controlled summation of antenna signals, for motor vehicles having a multi-antenna system with antenna switches coupled to antennas for producing at least two antenna output signals, comprising:

a receiver having a first input and a second input coupled respectively to the at least two antenna signals;

a phase-shifter having its input coupled to said second input of said receiver, whereby the received antenna output signal at said second input has the same phase at the output of said phase shifter as the antenna signal in the first receiver input;

a summation circuit for adding up the two received antenna signals in a phase-coincident manner, to produce at its output, an added-up signal, to be supplied to the frequency demodulator of the FM receiver;

a phase controller, having its input coupled to the output signal of said summation circuit, and having its output coupled to said phase shifter, said controller having a low pass filter to limit its speed of shifting of said phase shifter;

an interference detector having its input coupled to the output of said summation circuit for rapidly detecting a reception disturbance in said added-up signal caused by a swing in the frequency of the received FM signals, so as to produce an interference detection signal at the output of said detector; and a controllable logic switch having its output coupled to the antenna switches of said antenna system, and its input coupled to said interference detector so that when a received signal that is different in terms of diversity, is supplied to at least one of said two inputs, of said receiver from each of the different switching positions of the antenna switches said interference detector will actuate said logic switch and thus switch said antenna switches to another switching position, during the presence of a reception disturbance so that the output signal fed to the FM demodulator is free of reception interference.

2. The antenna diversity system according to claim 1, further comprising a plurality of reversing switches coupled to the input of the antenna switches respectively, and wherein said controllable logic switch further comprises a list containing a preset advantageous line-up of the switching positions of the antenna selector switches and the reversing switches filed in a memory on said controllable logic switching device, so that in the event an interference in said added-up signal is indicated, another received signal is supplied with minimal reversing time in an alternating manner, first to the one of the two signal paths, and supplied in the presence of a successively following interference indication to the other of the two signal paths.

3. The antenna diversity system according to claim 1, further comprising a signal evaluation processor having its input coupled to the output of said summation circuit, said processor containing said interference detector, a timing member for determining the time intervals TS between successive interference indications, and a logic circuit wherein the time intervals TS are compared in said logic circuit with the build-up time TE of the phase-controller so that in the event the build-up time falls short of a suitably preset build-up time TAPS one or more times, said build-up time being selected shorter, or not substantially longer than the build-up time TE, a reversing command signal P-S is generated by said evaluation processor for reversing from the phase mode to the scanning mode.

4. The antenna diversity system according to claim 3, wherein with said reversing command signal P-S for reversing from the phase mode to the scanning mode, a phase-setting signal is generated in said logic circuit-for turning off said phase controller and for fixing said phase shifter to a value that is constant in time and if an interference is indicated by the interference detector, another received signal is allocated to at least one of said two signal paths via an address signal generated by said logic circuit and supplied to the logic switch, and wherein the system operates in the scanning mode.

5. The antenna diversity system according to claim 4, wherein for operating in the scanning mode, the same received signal is supplied via said logic circuit to both signal paths, and said phase shifter is adjusted in a fixed manner so that an in-phase superimposition of the signals from the signal paths is present in said summation circuit.

6. The antenna diversity system according to claim 4, wherein for operating in the scanning mode, the time intervals between successive interference indications in said logic circuit are continually registered and associated with the switching positions in the multi-antenna system in a table, and that said table for continuously updating a priority list is sorted according to decreasing time intervals TS, and that when an interference is indicated by the interference detector, said logic circuit is reversed via an address signal to another received signal with the highest or a higher priority.

7. The antenna diversity system according to claim 6, additionally comprising a signal path selector having both signal paths and the added-up signal path connected on the input side, and wherein said interference detector is connected on the output side, and further comprising a clock disposed in said logic circuit, said clock switching the signal path selector through to said interference detector for testing the signal paths one at a time over a test time required for indicating disturbances in said interference detector.

8. The antenna diversity system according to claim 7, wherein for operating in the scanning mode, said summation circuit is supplied with only one received signal of one of the two signal paths 1 and 2 by opening a signal path switch located in signal path 2 upstream of the summation circuit, wherein said logic circuit in association with said clock provides in successive cycle periods, that a priority list with respect to the interference purity of the received signals such as the first signal is always available in an updated form by reversing the signal path selector between the two signal paths in association with the sequential switching-on of different first received signals by said logic circuit, and wherein, with said signal path selector being set to the added-signal path, and with an interference being present in said path, said summation circuit is supplied via said logic circuit with a different received signal with the highest or a higher priority, the different received signal being known in the priority list present in said logic circuit.

9. The antenna diversity system according to claim 8, wherein when the preset switching time TASP is exceeded one or more times in the scanning mode, wherein said switch-on time is selected to be at least as long, or substantially longer than the build-up time TE, a reversing command signal S-P is generated for reversing from the scanning mode to the phase mode.

10. The antenna diversity system according to claim 9, wherein in the event of the occurrence of a reversing command signal S-P for reversing from the scanning mode to the phase mode, said phase controller is closed by the phase-setting signal of said logic circuit, and said signal path switch is closed by a signal of said logic circuit, wherein a received signal with the highest or a high priority is selected for the associated signal path such as the signal path by an address signal and by the setting of said switching device resulting from such an address signal.

11. The antenna diversity system according to claim 9, wherein said detector comprises a first interference detector having an extremely rapid interference indication and connected to indicate disturbances in said added-up signal and a second interference detector having superior resolution and connected to said signal path selector, cycled between the two signal paths 1 and 2, whereby the signals indicating interference are supplied in an alternating manner for both signal paths 1 and 2 from the output of said signal path selector to said logic circuit, with good resolution of their quality.

12. The antenna diversity system according to claim 11, further comprising a third interference detector, and wherein for the purpose of permanent availability of the interference-indicating signals, said separate interference detectors with superior resolution are provided for each of the two signal paths 1 and 2, respectively.

13. The antenna diversity system according to claim 12, wherein said receiving device is a superheterodyne receiver, and said phase-shifter, said summation circuit and said interference detector or the interference detectors are provided at the level of the intermediate-frequency (IF) of said FM receiver.

14. The antenna diversity system according to claim 13, wherein said superheterodyne receiver comprises an I- and a Q-frequency shifter for generating the in-phase and the quadrature components of the intermediate-frequency received signals in the signal paths 1 and 2 with separate weighing of the I-Q components, for setting the phase via a phase-shifter member with said phase controller having TP-characteristics, and wherein said summation circuit comprises a plurality of summing circuits for combining each of the I-Q components for generating the complete, frequency-modulated intermediate-frequency (IF) signal for the rapid detection of disturbances in said operating interference detector.

15. The antenna diversity system according to claim 14, further comprising a digital signal processor DSP for receiving the digitized I- and Q-components on the output of the added-up signal path for further processing.

16. The antenna diversity system according to claim 14, further comprising frequency shifters coupled to signal paths 1 and 2 for providing digitized I- and Q-components on their outputs and coupled to said digitally operating signal processor DSP so that reception disturbances are processed in the system by digital signal processing methods.

17. The antenna diversity system according to claim 14, wherein the build-up time of said controller is adequately short for fast vehicle driving, but not excessively short in order to avoid an audible swing in the frequency of the interference, and is preferably selected in the order of magnitude of TE=20 ms to 50 ms, and the preset switch-on time TASP serving in the scanning mode as the criterion for triggering the electric reversing command S-P for reversing from the scanning mode to the phase mode, preferably from 5 to 10 times the value of TE; and the preset switch-on time TAPS serving in the phase mode as the criterion for triggering the electric reversing command P-S for reversing from the phase mode to the scanning mode preferably is from 5 to 10 times the value TE.

18. The antenna diversity system according to claim 14, wherein said first interference detector having extremely rapid indication provides an interference indication within 50 .mu.s, due to the filter running time, and less than 100 .mu.s, and said second and third interference detectors with superior resolution provide an interference indication within 1 ms to 5 ms, due to filter running time.

19. The antenna diversity system according to claim 18, wherein the test time is as short as possible, and is selected between the time period required by the interference detector with extremely rapid indication for indicating an interference, and twice as long as said time period.

20. The antenna diversity system according to claim 19, wherein said phase-shifter is set in the phase mode so that the signal-to-noise ratio is maximal at any time.

21. An antenna diversity system for receiving frequency-modulated (FM) radio signals having a multi antenna system with antenna switches coupled to antennas for producing at least two antenna output signals, comprising:
a means for shifting the phase of at least one antenna output signal and summing the appropriately phased antenna output signals resulting in an added-up signal;
a phase controller, having its output coupled to said means for shifting the phase, said controller having a low pass filter to limit the speed of shifting of said means for shifting the phase; and
a detector for detecting reception disturbances in said added-up signal and actuating the antenna switches in response to a reception disturbance so as to select such a switching position in which the output signal for the FM receiver is free of interference.

22. The antenna diversity system of claim 21 wherein said detector comprises a means for switching said antenna switches through a logic switch that actuates said antenna switches during a reception disturbance.

23. The antenna diversity system of claim 21 wherein said means for shifting the phase of at least one antenna output signal is such that said antenna output signals resulting in said added-up signal are identically phased.

24. The antenna diversity system of claim 21, wherein said means for shifting the phase of at least one antenna output signal comprises a phase control means to adjust the phase of said means for shifting the phase for creating a maximum signal-to-interference ratio in the added-up signal.

25. An antenna diversity system for receiving frequency-modulated (FM) radio signals in an FM receiver with the phase-controlled summation of antenna signals, for motor vehicles having a multi-antenna system with antenna switches coupled to antennas for producing at least two antenna output signals, comprising:
a receiver having a first input and a second input coupled respectively to the at least two antenna signals;
a phase-shifter having its input coupled to said second input of said receiver whereby the received antenna output signal at said second input has the same phase at the output of said phase shifter as the antenna signal in the first receiver input;
a summation circuit for adding up the two received antenna signals in a phase-coincident manner, to produce at its output, an added-up signal, to be supplied to the frequency demodulator of the FM receiver;
a phase controller having its input coupled to the output signal of said summation circuit, and having its output coupled to said phase shifter controller having a low pass filter to limit its speed of shifting of said phase shifter so that no audible disturbing frequency swing can occur within the operating range of said phase controller;
an interference detector having its input coupled to the output of said summation circuit for rapidly detecting a reception disturbance in said added-up signal caused by a swing in the frequency of the received FM signals, so as to produce an interference detection signal at the output of said detector; and
a controllable logic switch having its output coupled to the antenna switches of antenna system, and its input coupled to said interference detector so that when a received signal that is different in terms of diversity, is supplied to at least one of said two inputs of said receiver from each of the different switching positions of the antenna switches detector will actuate said logic switch and thus switch antenna switches to another switching position, during the presence of a reception disturbance so that the output signal fed to the FM demodulator is free of reception interference.

26. The antenna diversity system as in claim 25, wherein the time period for the changes of the phases of antenna signals is in the order of 1 to 20 ms.

27. An antenna diversity system for receiving frequency-modulated (FM) radio signals having a multi antenna system with antenna switches coupled to antennas for producing at least two antenna output signals, comprising:
a means for shifting the phase of at least one antenna output signal and summing the appropriately phased antenna output signals resulting in an added-up signal;
a detector for detecting reception disturbances in said added-up signal and actuating the antenna switches in response to a reception disturbance so as to select such a switching position in which the output signal for the FM receiver is free of interference; and
a means for limiting the speed of said means for shifting the phase of at least one antenna output signal.

* * * * *